United States Patent Office 3,459,493
Patented Aug. 5, 1969

3,459,493
PROCESS FOR SAFELY REACTING ACTIVE
METALS
Francis J. Ross, Niagara Falls, N.Y., assignor to E. I.
du Pont de Nemours and Company, Wilmington, Del.,
a corporation of Delaware
No Drawing. Filed Jan. 23, 1967, Ser. No. 610,768
Int. Cl. C01g 1/00
U.S. Cl. 23—1
7 Claims

ABSTRACT OF THE DISCLOSURE

A safe, controllable, convenient process for reacting an active metal with a reactive liquid comprising immersing said metal in a two-layer liquid system, the top layer being a nonreactive liquid and the bottom layer being a reactive liquid.

Background of the invention

Active metals, such as sodium, potassium, lithium, and calcium are widely used because of their valuable properties. For example, sodium is used in the manufacture of tetraethyl lead due to its chemical reactivity. Sodium's low melting point and excellent heat conductivity, on the other hand, render it valuable as a fluid in certain types of heat exchangers and in the metal quenching operation of the alloy coating art as disclosed in U.S. Patent 3,184,331. Sodium-filled conductor cables have been reported in the literature and may become increasingly important. Despite the great differences in the processes employing active metals, there is a common problem concerning the reactivity and disposal of the active metals. Sodium is the most typical of the active metals and is therefore the metal to which much of the discussion hereinafter is directed. It is to be understood, however, that the discussion is equally applicable to the other reactive metals.

The manufacture, handling and use of sodium frequently involve the reaction of the sodium and water to: (1) make sodium hydroxide and hydrogen; (2) clean equipment or articles of manufacture; (3) dispose of sodium residues and waste. This reaction is difficult to control and may produce local temperatures above those tolerable in the equipment. The reaction is, additionally, difficult to use below 316° C. Since the melting point of sodium hydroxide is about 318° C., the compound is solid at 316° C. Consequently, when the temperature is kept relatively low, a crust of solid sodium hydroxide may form over the unreacted sodium. The steam or water utilized eventually dissolves away patches of the crust, whereupon the steam or water suddenly contacts the metal underneath. The high temperatures evolved and the hydrogen gas trapped under the crust then lead to violent explosions. Of course, it is well known that when sodium comes in contact with water, hydrogen is liberated which in the presence of air, is likely to ignite. Furthermore, this reaction of the hydrogen with the oxygen in the air may very well occur with explosive violence. Because of this, sodium disposal has been a difficult problem, especially on a large scale.

Several methods have been utilized heretofore to dispose of sodium residues. All, however, suffer from various disadvantages. One method of disposal involves burning sodium in air. Although effective when special sodium burners are available, this method is inapplicable to sodium held within complex apparatus because the interior thereof cannot be reached. The oxidation of sodium also generates excessive heat, as well as solid residues and smoke which cause air pollution problems.

Previously known methods for the disposal of active metals have involved reacting the metal with an alcohol, or dissolving the metal in anhydrous ammonia. Such methods are disclosed in British Patent No. 574,360 and by Jackson, "Liquid Metals Handbook-Sodium-Nak Supplement," July 1, 1955, Atomic Energy Commission, Department of the Navy, Washington, D.C., pages 264–267, 394 and 395. All of these methods previously disclosed suffer from various disadvantages, such as being expensive or complicated or giving rise to flammability or explosion hazards.

It, therefore, it apparent that a more efficient and less hazardous method for reacting and disposing of active metals is necessary. While the art is well aware of many methods for reacting active metals, there is a definite need for a method of reacting and disposing of active metals which is safe, rapid, efficient and which can be operated under standard conditions.

Summary of the invention

This invention relates to a novel and highly useful process for reacting active metals with a reactive liquid under safe, controlled conditions. This process has many advantages over the prior art whether applied to the manufacture of active metal compounds, the cleaning of equipment and articles of manufacture, or the safe disposal of active metal residues and waste.

Basically, the process of this invention provides a safe, controlled method for the conversion of the active metal to the corresponding metallic compound (e.g., hydroxide, chloride) by contacting said metal with a two-layer liquid system, the top layer being a low specific gravity nonreactive liquid and the bottom layer being a high specific gravity reactive liquid. The presence of the nonreactive liquid phase limits the reaction rate between the metal and the reactive liquid, and provides a heat sink for the heat of reaction. Depending upon the objects to be achieved, the various process parameters may be altered in such a way as to insure that the reaction is aways kept under control and that no dangerous buildup of by-product hydrogen occurs. These parameters include: ratio of reactive liquid to nonreactive liquid, system temperature, choice of liquid phases, and salts present.

Simple two-layer liquid systems consisting of an inert hydrocarbon oil as the top layer and water as the bottom layer are generally preferred, but in some cases it may be desirable to add other reactants, stabilizers, or antifoam agents to produce other desired results.

The invention is particularly applicable to sodium metal, but the method of this invention is also applicable to other reactive metals such as lithium, potassium, alloys thereof, calcium and mixtures of any of the foregoing.

Description of the preferred embodiments

The process for safely, conveniently, controllably, and completely reacting an active metal to convert the active metal to the corresponding metal salt and generate hydrogen comprises immersing said metal in a two-layer liquid system, preferably at the interface of the two liquids, the top layer being a nonreactive liquid and the bottom layer being a reactive liquid. The process is carried out at a temperature at which the system is a liquid, approximately from 0–100° C.

The essence of the invention lies in the use of the reactive liquid-nonreactive liquid two-layer system which controls the rate of reaction. The reactive liquid phase, which is designated as reactive since it reacts with the active metal, comprises a liquid such as water. The nonreactive liquid phase, which is designated as nonreactive since it does not react with the active metal, comprises a liquid such as an inert, immiscible hydrocarbon oil. The specific gravities of these two liquids are of the utmost importance. The top layer, nonreactive liquid should have a low specific gravity which is less than the specific gravities of the active metal and the reactive liquid. The bottom layer, reactive liquid should have a high specific gravity which is greater than the specific gravities of the active metal and the nonreactive liquid. Correspondingly, the active metal should have a specific gravity greater than the top nonreactive layer but less than the bottom reactive layer. This provides the necessary inert top liquid layer and a reactive bottom liquid layer so that, ideally, the metal is suspended at the interface of the two liquids. The low specific gravity requirement for the nonreactive liquid layer is necessary so that the metal will sink through this liquid to the reactive liquid while being maintained under an inert atmosphere. The reactive liquid must have a high specific gravity so that the active metal does not sink into it; an undesirable violent reaction would occur if the active metal sinks into the reactive liquid. In this invention, the metal only penetrates the surface of the reactive liquid. For purposes of convenience only, the reactive liquid and nonreactive liquid utilized in this invention may be referred to as water (aqueous) and oil respectively throughout the specification. This is not intended to limit the scope of this invention.

In a preferred practice, the desired quantity of the reactive metal(s) is dropped into a container containing the two-layer liquid system. The active metal sinks through the nonreactive liquid to the nonreactive layer-reactive layer interface. The reactive layer and the active metal react immediately with the formation of hydrogen. The hydrogen lifts the active metal from the interface of the liquids into the nonreactive liquid and the reaction stops. As the hydrogen disengages the active metal sinks back into the reactive liquid. This process repeats itself over and over again until the active metal has completely reacted or until the hydroxide or salt concentration in the reactive liquid slows the reaction to a point where it is too slow to be useful.

The amount of each liquid layer is dependent on the desired speed of reaction and quantity of active metal to be reacted. Since the reaction between the active metal and the reactive liquid produces hydrogen and heat, there should be enough nonreactive liquid to cool the hydrogen so that the hydrogen does not explode when it reaches the surface of the nonreactive liquid by reacting with any oxygen present at the surface of the nonreactive liquid. Of course, if an inert atmosphere is provided above the surface of the nonreactive liquid, the main function of the nonreactive liquid is then to slow down the rate of reaction between the active metal and the reactive liquid. The amount of reactive liquid is dependent upon how much active metal is desired to be reacted over a period of time and upon the salt concentration which builds up in the reactive liquid. A desirable (although not required) weight ratio of nonreactive liquid to reactive liquid is within the range of from 5:1 to 1:1.

The amount of active metal to be reacted and the rate of reaction are controlled by relatively simple procedures. It is desirable to start with small quantities of active metal and observe how fast the reaction proceeds and how well the nonreactive liquid controls the temperature and rate of reaction. By successive observations and adjustments, the rate of reaction can readily be controlled. Thus, the rate of reaction is dependent upon the amounts of liquids and of metal(s) which are utilized. The amount of nonreactive liquid which is utilized is also important in controlling the heat dissipation of the reaction.

The reactive liquid, although not necessarily, usually comprises an aqueous liquid. For example, water or aqueous sodium hydroxide may be utilized as the reactive liquid. Any reactive liquid which has the required specific gravity and which reacts with the active metals can be utilized for purposes of this invention.

The reactive liquid may also contain various acids, bases, or salts which are reactive with the active metal to produce the corresponding salts of the acids or bases. Additionally, various salts can be added to the reactive liquid to increase the specific gravity of the liquid or act as diluents to control the rate of reaction. Specific examples of compounds which may be present in the reactive liquid include: potassium chloride, sodium chloride, calcium chloride, strontium chloride, barium chloride, sodium hydroxide, and hydrogen cyanide.

The nonreactive liquid which is designated as nonreactive since it does not react with the active metal, will generally comprise an inert hydrocarbon oil. The nonreactive liquid should not be a solvent for the active metal and should have a low solubility in the reactive liquid so that two separate liquid layers are formed and so that the metal does not dissolve in the nonreactive liquid. The specific gravity of the nonreactive liquid must be lower than the specific gravity of the reactive liquid and of the active metal. This is necessary to form a two-layer system with the nonreactive layer as the top layer and also so that the active metal can sink through the nonreactive liquid to the reactive liquid. The nonreactive liquid may be any of a wide variety of inert hydrocarbon oils, i.e., oils that are not reactive with the active metal. Examples of such inert hydrocarbon oils include: paraffinic hydrocarbons, lubricating oils, and fuel oils (especially Nos. 3 to 6). Particularly suitable are kerosene and mineral oil. It is preferred that the hydrocarbon oil have a low solubility in water (immiscible), that it not be reactive with the metal, that it not be a solvent for the active metal, that the oil not be flammable under operating conditions (high flash point), that the oil have a low vapor pressure (a high boiling point so that there is no appreciable loss of oil), and that the oil have a specific gravity less than the reactive liquid and the active metal.

The metals which are considered to be reactive metals and present the problems of reactivity and disposal include alkali metals and alkaline metals such as sodium, potassium, lithium, alloys thereof, calcium, strontium, and mixtures thereof.

The temperature at which the process is carried out is generally a temperature at which the layers remain liquid and at which the vapor pressure is such that the liquids are not driven off. Also, the temperature should be low enough to maintain the metal in a solid state. The usual temperature is approximately within the range of 0–100° C. Below the freezing point of the aqueous liquid the reaction rate would be very low. The upper limit is set by the boiling point of the liquid layers. However, as the active metal reacts with the water to form a salt, the boiling point of the aqueous phase is raised and the melting point is lowered. Thus, the process of this invention may be operated at any temperature at which the layers are liquid. Additionally, various acids, bases, or soluble salts may be added to the system and consequently effect the melting and boiling points of the aqueous phase. A preferable temperature range is from 10–50° C.

The terminology "immersing" said metal in a two-layer liquid system is intended to encompass any type of immersion step. For example, a physical act of immersing such as dipping is satisfactory. The most convenient method is by dropping the metal or metal-containing material into the liquid system. While this terminology encompasses submerging the metal or metal-containing material in the reactive liquid or holding the metal in the reactive liquid, it is preferred that the metal be immersed in the liquids at the interface of the reactive and nonreactive liquids.

It is apparent from the foregoing discussion that there are several important parameters in the process of this invention. The nonreactive liquid must have a specific gravity less than the specific gravities of the reactive liquid and of the active metal so that the nonreactive liquid is the top layer of the two-layer system. The reactive layer must have a specific gravity greater than the specific gravities of the nonreactive liquid and the active metal.

The active metal must have a specific gravity less than the reactive liquid but greater than the nonreactive liquid so that the metal sinks through the nonreactive liquid into the nonreactive liquid-reactive liquid interface, but so that the metal does not sink through the interface and go completely into the reactive liquid. Also, one of the reaction products must be a gas, preferably hydrogen, so that it lifts the active metal from the interface to the nonreactive liquid to dissipate heat and slow down the rate of reaction. The amounts of reactive liquid and active metal must be adjusted to provide a controlled rate of reaction.

The process of this invention can be operated as a batch or continuous process. In a continuous process the salts which are formed from the reaction of the reactive liquid and the active metal gradually build up in the system. Consequently, moderate amounts of the reactive liquid should be continually removed from the system and replaced with fresh reactive liquid corresponding to the amount of reactive liquid that is reacted. Of course, in a batch process the metal and the two-layer liquid system are simply placed in a container and allowed to completely react.

Following the complete reaction of the active metals in a batch process, if desired, the two liquid layers are simply separated to recover the nonreactive liquid for further use and to recover the metal salts for further processing or use. In a continuous process the same separation technique is employed, but the separation is preferably done in a continuous manner; that is, a portion of the two-layer liquid system is continuously removed to a separation zone or container where the layers separate and are decanted. The non-reactive liquid can be recycled to the continuous process while the salt-containing reactive liquid can be saved for further processing or use.

The invention is illustrated by the following examples.

Example 1

Eight hundred cc. of white oil and 200 cc. of 25% aqueous sodium hydroxide were placed in a 2,000 cc. beaker. The two liquids were allowed to separate into two layers at 20° C. White oil has a specific gravity of .88 and 25% caustic has a specific gravity of 1.27. One gram of metallic sodium was dropped into the beaker. The sodium sank through the oil into the interface of the two liquids where it floated. The reaction took place and the hydrogen which was formed lifted the sodium into the nonreactive oil layer. The hydrogen disengaged; the sodium sank into the interface and the operation repeated itself until the sodium had been completely reacted, which took about 15 minutes.

The process of this invention has many applications in addition to the above method of safely, conveniently, and controllably reacting sodium or any other active metal to form the metal hydroxide or salt. For example, there is a sodium disposal problem that exists in connection with sodium-filled polyethylene tubing which is designed for use in electrical conductor cable. Used or scrap cable is not amenable to the common sodium burning disposal technique since the inert polyethylene severely restricts burning while at the same time producing large quantities of noxious smoke. By use of the process of this invention the sodium can be removed from the polyethylene tubing by a safe and convenient method not known heretofore. This is demonstrated by the following example.

Example 2

Eight hundred cc. of white oil and 200 cc. of 25% aqueous sodium hydroxide were placed in a 2,000 cc. beaker. The two liquids were allowed to separate into two layers at 20° C. To the system, a piece of sodium-filled polyethylene tubing was added in order to remove the sodium core. The tubing was approximately 1½ inch long and ½ inch outside diameter while the sodium core was approximately ⅜ inch diameter. The tubing sank through the oil to the interface of the liquids where it floated. Reaction took place and the hydrogen formed lifted the tubing into the nonreactive oil layer. The hydrogen disengaged, the tubing sank to the interface, and the operation repeated until completion in 35 minutes. The resulting clean polyethylene was separated from the liquid system and adaptable for any further desired use.

Long lengths of sodium-filled polyethylene conductor cable can be disposed of on a continuous basis (with regard to the sodium content) by feeding the cable through a splitter to split the cable longitudinally. Thereafter the split cable is fed into a tank containing the two-layer liquid system and the continuous process of this invention is operated as previously described. The clean split polyethylene tubing is continuously withdrawn from the tank onto a take-up reel.

In the manufacture of sodium by the molten NaCl electrolysis process, a sludge is formed. This is common knowledge as disclosed by Sittig, "Sodium, Its Manufacture, Properties, and Use" (1956), page 34, and U.S. Patents 2,071,126 and 2,073,631. The sludge, commonly referred to in the trade as sodium filter scrap, contains approximately 70% sodium, 20% calcium, and 10% of the corresponding chlorides and oxides. By using the process of this invention, a safe, economical process for the disposal of sodium filter scrap is achieved. The sodium filter scrap is converted to sodium and calcium salts and hydrogen. This is demonstrated by the following example.

Example 3

Eight hundred cc. of white oil and 200 cc. of 25% aqueous sodium hydroxide were placed in a 2,000 cc. beaker. The two liquids were allowed to separate into two layers at 20° C. one and one-half grams of the sodium filter scrap were dropped into the beaker. The sludge sank through the oil into the interface where it floated. The reaction took place and the hydrogen which formed lifted the sludge into the nonreactive oil layer. The calcium reacted to form calcium hydroxide and was deposited in the bottom of the beaker as a fine white powder. The hydrogen disengaged; the sludge sank into the interface and the operation repeated itself until the sodium and calcium had been completely reacted, which took approximately 10 minutes. At the end of this time, the sodium filter scrap had been safely and completely converted to sodium hydroxide, calcium hydroxide and hydrogen.

The process of this invention is also useful in cleaning equipment which contains active metals. In this process, the equipment is dipped into the two-layer liquid system and physically held at the interface of the two liquids. Manual or mechanical buoyancy can be supplied to raise the equipment from the interface to the nonreactive liquid since the equipment in most cases would be too heavy to be buoyed up by the hydrogen.

Of course, as previously discussed, various other ingredients such as salts, sodium hydroxide, or hydrogen cyanide can be added to the reactive liquid phase. Thus, if hydrogen cyanide were added to the reactive liquid, sodium cyanide would be one of the resulting products produced by this invention.

The atmosphere which may be employed in the process of this invention is not of any inventive significance. Either air, hydrogen or inert gas (argon, krypton, nitrogen) may be used as the atmosphere above the two-layer system. If air is the atmosphere utilized, it is essential to avoid explosive mixtures of air and the hydrogen which are being evolved by the process. This can be easily accomplished by providing a suitable stream of air to dilute the hydrogen to the nonexplosive range or to limit the reaction rate. The choice of a particular atmosphere is left to those skilled in the art.

By using the teachings of this invention, various active metals can be disposed of in a safe, convenient, and controllable manner. The novel use of the reactive liquid-nonreactive liquid two-layer system provides a safe method for converting metals to their metallic salts and hydrogen without encountering the heat, flammability, explosiveness and other related problems of prior methods.

Since it is obvious that many changes and modifications can be made in the above-described details without departing from the nature and spirit of the invention, it is to be understood that the invention is not to be limited to said details except as set forth in the appended claims.

What is claimed is:

1. A process for safely, conveniently, and controllably reacting an active metal selected from the group consisting of sodium, potassium, lithium, alloys thereof, calcium, and mixtures of any of the foregoing, with an aqueous liquid comprising immersing said metal in a two-layer liquid system at the interface of the two layers, the top layer being a nonreactive liquid and having a specific gravity less than the specific gravity of the aqueous liquid and of the active metal, the bottom layer being an aqueous liquid and having a specific gravity greater than the nonreactive liquid and the active metal, and the active metal having a specific gravity less than the aqueous liquid but greater than the nonreactive liquid, said process being carried out under conditions such that the rate of reaction is safely controlled by adjusting the amount of aqueous liquid, nonreactive liquid, and active metal present and under conditions of reaction and ventilation such that an explosive mixture of by-product hydrogen with any surrounding air cannot be formed.

2. A process in accordance with claim 1 wherein the nonreactive liquid phase comprises an inert hydrocarbon oil.

3. A process in accordance with claim 1 wherein the process is carried out at a temperature within the range of 0–100° C.

4. A process in accordance with claim 1 wherein the weight ratio of nonreactive liquid to aqueous liquid is within the range of from 5:1 to 1:1.

5. A process in accordance with claim 1 wherein the aqueous liquid comprises water and a substance selected from the group consisting of sodium chloride, sodium hydroxide, calcium chloride, calcium hydroxide, hydrogen cyanide and mixtures thereof.

6. A process in accordance with claim 1 wherein the active metal comprises a sodium filled polyethylene tubing, said tubing being immersed at the interface of the two liquid layers and wherein the reaction occurs at the said interface.

7. A process in accordance with claim 1 wherein the active metal is sodium sludge filter scrap.

References Cited

UNITED STATES PATENTS

| | | | |
|---|---|---|---|
| 2,527,443 | 10/1950 | Padgitt | 23—184 |
| 2,718,458 | 9/1955 | Browning | 23—184 |
| 2,837,408 | 6/1958 | Sakowski | 23—184 |
| 3,287,085 | 11/1966 | Jenks | 23—79 |

OTHER REFERENCES

J. W. Mellor's book, "A Comprehensive Treatise on Inorganic and Theoretical Chemistry," vol. 2, 1922 edition, pp. 452, 453 and 469. Longmans, Green & Co., N.Y., publishers.

EDWARD STERN, Primary Examiner

U.S. Cl. X.R.

23—50, 79, 184, 186, 211, 212